United States Patent

[11] 3,630,393

| [72] | Inventor | Sadakatsu Yamamuro<br>Iwata, Japan |
|---|---|---|
| [21] | Appl. No. | 53,641 |
| [22] | Filed | July 9, 1970 |
| [45] | Patented | Dec. 28, 1971 |
| [73] | Assignee | The Toyo Bearing Manufacturing<br>Company Limited<br>Osaka, Japan<br>Continuation-in-part of application Ser. No. 734,347, June 4, 1968, now abandoned. This application July 9, 1970, Ser. No. 53,641 |

[54] APPARATUS FOR ORIENTING DISCLIKE ARTICLES
8 Claims, 10 Drawing Figs.

[52] U.S. Cl. .................................................. 214/7,
198/33 AA, 221/171, 221/182
[51] Int. Cl. .................................................. B65g 57/08
[50] Field of Search .................................... 198/33 AA;
214/7; 193/43; 221/178, 182, 171; 133/1, 1 A

[56] References Cited
UNITED STATES PATENTS

| 2,345,310 | 3/1944 | Willoughby | 214/7 X |
| 2,355,201 | 8/1944 | Blackstone | 133/1 X |

Primary Examiner—Gerald M. Forlenza
Assistant Examiner—Robert J. Spar
Attorney—Rommel & Rommel ABSTRACT: Apparatus for orienting disclike articles into a substantially straight line side-by-side relationship which includes an inclined rotating cylindrical tube through which the disclike articles pass in attaining the desired relationship.

PATENTED DEC 28 1971 3,630,393

INVENTOR
Sadakatsu Yamamuro

BY *Rommel and Rommel*
ATTORNEYS

APPARATUS FOR ORIENTING DISCLIKE ARTICLES

This application is a continuation-in-part of my copending application, Ser. No. 734,347, filed June 4, 1968 now abandoned.

This invention relates to a method and apparatus for orienting disclike articles.

Heretofore many problems have existed in the conveying of disclike articles from one place to another and in which it is desired that the articles be in a predetermined relationship with respect to each other when they arrive at the second location. For instance, in the manufacture of bearing housings, which have a disclike or shallow cylindrical shape, it is usually desirable to have the partially finished bearing housings conveyed in a side-by-side relationship to facilitate further processing.

In the past, the practice has been to roll such partially completed disclike members down an inclined chute, to a zone where they are manually oriented for conveyance to another location or zone. This has not proven satisfactory for mass production. In instances where it has been sought to do away with the manual alignment by some peculiar configuration of the chute through which the disclike articles are rolled, alignment has not been completely reliable and, since the disclike articles have a tendency to bump into one another as they traverse through the chute and as they reach a secondary conveyor, the articles abut against one another in a manner to produce a disordered arrangement.

The primary object of the present invention is to provide a method and apparatus which employs an inclined rotating cylindrical tube for receiving the disclike articles, the disclike articles being caused to pass through the cylindrical tube in a manner whereby they emerge from the tube already arranged in a side-by-side relationship.

Other objects and advantages of the invention will become apparent during the course of the following detailed description of the invention, taken in connection with the accompanying drawings, forming a portion of this disclosure, and in which drawings.

In the drawings, wherein for the purpose of illustration is shown a preferred embodiment of the invention, and wherein similar reference characters designate corresponding parts throughout the several views.

Figure 1:
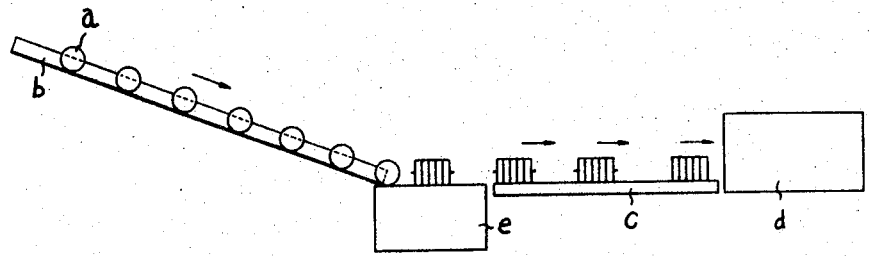
FIG. 1 is a diagrammatic side view of typical apparatus for orienting a plurality of disclike articles by manual manipulation thereof as they are conveyed from one zone to another.

In the conveyor of FIG. 1 disclike articles $a$ are rolled down a chute $b$ onto a fixed support $e$ wherein they are manually arranged in a side-by-side relationship and placed on such as a roller conveyor $c$ for transfer to a station $d$ for further treatment. It is obvious that the rate at which the disclike articles can be conveyed is dependent upon the dexterity of the operator who manually arranges the disclike articles in a side-by-side relation. This is therefore obviously an inefficient operation which would not readily lend itself to continuous mass production techniques.

Figure 2:
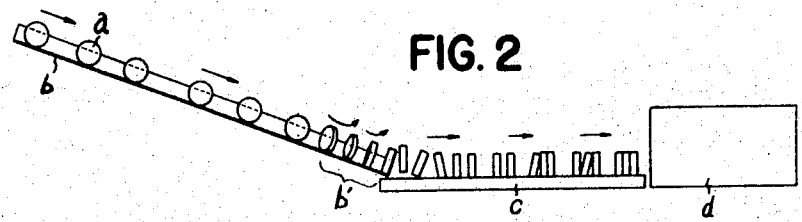
FIG. 2 is a diagrammatic side elevational view of typical apparatus having a chute configuration intended to orient disclike articles.
Figure 3:
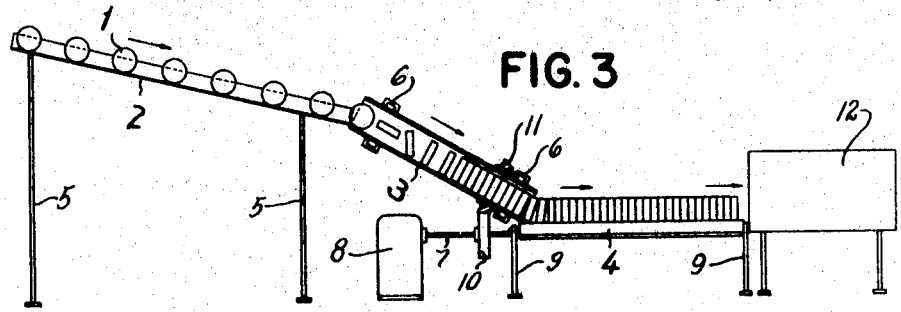
FIG. 3 is a diagrammatic side elevational view of an example of the improved apparatus of the present invention.

As shown in FIG. 2, it has been proposed to modify the arrangement of FIG. 1, by eliminating fixed support $e$ and shaping a portion $b'$ of chute $b$ to act in twisting the articles so that they may be directly discharged onto such as a roller conveyor $c$. However, this has proven to be a very unreliable manner of securing any orderly arrangement in a side-by-side relationship, and facilitates a "domino" effect whereby the disclike articles bounce into one another as they are discharged onto roller conveyor $c$.

Figure 4:
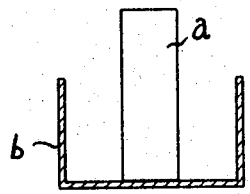
FIGS. 4, 5 and 6 are transverse sectional views of the chutes of FIGS. 1 and 2 showing disclike articles traveling therealong.
Figure 5:
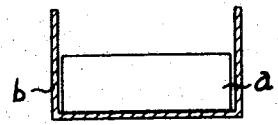
Figure 6:
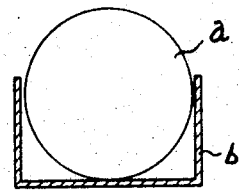

FIGS. 4, 5 and 6 show a general configuration of the type of chute $b$ employed in the devices of FIGS. 1 and 2, and also illustrate the various positions which the disclike articles $a$ may assume in traveling down chute $b$.

FIGS. 3 and 7 to 10 inclusive illustrate my improved apparatus.

My improved apparatus preferably includes a chute 2 which may be substantially like chute $b$, but need not be inclined as much from the horizontal or be as long as are the chutes $b$ of FIGS. 1 and 2. Chute 2 may be supported on legs 5 to provide a first zone from which disclike articles 1 may be conveyed for further processing or handling thereof.

Positioned adjacent the lower end of chute 2 is an inclined rotating cylindrical tube 3. Inclined cylindrical tube 3 may be be rotatably supported in any approved manner. For example, it may be rotatably supported on spaced-apart bearing housings 6, the outer housing rings being carried by a suitable fixed support (not shown).

Roller conveyor 4 may be similar to roller conveyor $c$ of FIGS. 1 and 2, and may be conventionally rotatable through conventional gearing by shaft 7 in operative connection with a suitable motor 8. Legs 9 may support the roller conveyor in position to receive disclike articles from the discharge end of tube 3 and to convey them to a second zone 12 for further processing, packing, etc.

In order to rotate inclined cylindrical tube 3 I may provide any suitable means such as a gear wheel 10 which may be mounted upon shaft 7 and may mesh with a ring gear 11 which is attached to tube 3.

Figure 7:
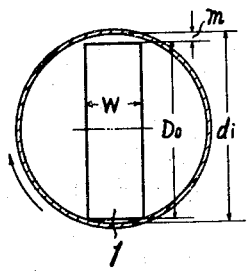
FIGS. 7, 8 and 9 are transverse sectional views of the tube of FIG. 3, with disclike articles contained therein.

Referring to FIG. 7, my improved apparatus is designed for use in orienting disclike articles having an outer diameter (Do) which is greater than the width (W). This is for the obvious reason that if the width is greater than the outer diameter, then it is not necessary to change the posture of the disclike article as it is being conveyed. As previously stated, the device has been found to be particularly suitable for conveying bearing housings, and the same are usually of the dimensions:

Do—26 mm.≈420 mm.

W—8 mm. ≈ 80 mm.

In the conveying and orienting operation, tube 3 is continuously rotated in order to properly orient the disclike articles being conveyed. It is obvious that there are a great number of variables which must be taken into consideration, such as the inclination of tube 3, the speed of rotation of tube 3, the inner diameter of tube 3, the outer diameter of the disclike article, the width of the disclike article, etc. Some of these items are more critical than others and it is believed that the following description will facilitate a full and complete understanding of the invention.

Figure 8:
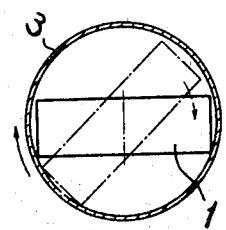
Figure 9:
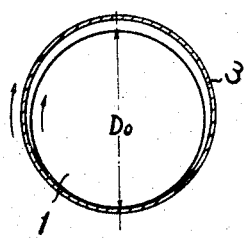
Figure 10:
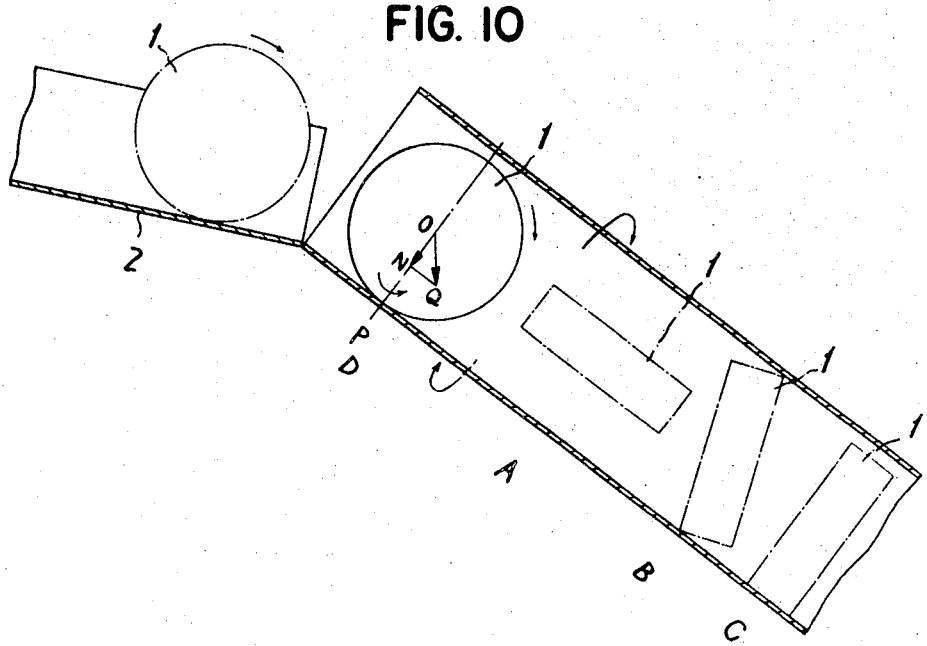
FIG. 10 is an enlarged sectional view showing conveying and orientation of disclike articles as they pass through the inclined rotating cylindrical tube of my invention.

Insofar as the angle of inclination of tube 3 is concerned, in the orienting of bearing housings for which the invention was primarily designed it was found that the angle of inclination should be greater than 0° and not more than 45°, usually from 20° to 30°. If the angle of inclination is greater than 45°, the disclike articles virtually fall through tube 3. It is obvious that the angle of inclination of tube 3 is directly related to the speed of rotation thereof. This relationship is preferably such that rotation of tube 3 exerts a centrifugal force (indicated by the moment force vector ON of FIG. 10) on the disclike article so that it rotates 90° on axis OP, as shown in stages D, A, B and C of FIG. 10, the weight of the product (indicated by gravity moment of force vector OQ of FIG. 10) being sufficient to cause the disclike articles to proceed through the tube. In other words, the angle of inclination and speed of rotation of tube 3 are preferably balanced with the weight of the article so that ON<OQ, being small enough to permit tube 3 to exert a sufficient centrifugal force ON on the article to frictionally engage and carry the same for 90° rotation about axis OP, from the position shown in FIG. 7 to the position as shown in FIG. 8 and then to the position as shown in FIG. 9.

This exact relation of inclination, weight and speed of rotation is not as critical as it would first appear. For instance, the apparatus is effective when the tube inclination is from 20° to 30° for an article weighing from 30 to 40 grams at a speed of rotation from 50 to 300 r.p.m. the lower rotational speed being preferable.

As a matter of fact, the more critical consideration is the relation of the inner diameter of tube 3 (di of FIG. 7) to the width and outer diameter of the disclike article (W and Do of FIG. 7). This should be specifically determined by the formula:

$$\sqrt{Do^2 + W^2} < di < \sqrt{Do^2 + (2W)^2}$$

As to the clearance between the upper edge of the outer diameter of the article and the inner diameter of tube 3 ($m$ of FIG. 7), the nearer $di$ approaches the value of $\sqrt{Do^2+W^2}$, the better. That is:

$$m \doteq \sqrt{Do^2+W^2}$$

Giving several examples

| Do | W | di |
|----|----|----|
| 30 | 9 | 32 |
| 32 | 10 | 34 |
| 35 | 11 | 37 |
| 40 | 12 | 43 |
| 47 | 14 | 50 |
| 62 | 17 | 65 |
| 62 | 16 | 65 |

Various changes may be made in the size and arrangement of the parts herein shown and described without departing from the spirit of the invention or the scope of the following claims.

I claim:

1. In apparatus for receiving a plurality of disclike articles in a substantially end-to-end relationship and for orienting said articles into a substantially side-by-side relationship, the combination of an elongated cylindrical tube inclined from the horizontal at an angle of inclination of greater than 0° and not greater than 45°, said tube having an upper article receiving mouth for receiving disclike articles in an end-to-end relationship and a lower discharge mouth from which to discharge articles in a side-by-side relationship, therefrom, the dimensions of the disclike articles and the dimension of the elongated cylindrical tube having a ratio of:

$$\sqrt{Do^2+W^2} < di < \sqrt{Do^2+(2W)^2}$$

wherein:
Do is the outer diameter of the disclike article
W is the width of the disclike article
$di$ is the inner diameter of the cylindrical tube;
means to continuously rotate said tube about its longitudinal axis during orientation, means for feeding disclike articles into said receiving mouth of said tube and means for receiving disclike articles from said discharge mouth of said tube.

2. Apparatus as described in claim 1 wherein: $m$ is the clearance between the upper edge of the outer diameter of the disclike article and the inner diameter of said tube and the same is:

$$m \doteq \sqrt{Do^2+W^2}.$$

3. Apparatus as described in claim 1 wherein the angle of inclination and speed of rotation of said tube are balanced with the weight of the disclike article being oriented so that ON<OQ, wherein:
ON is the centrifugal moment of force vector exerted on the disclike article, and
OQ is the gravity moment of force vector of the disclike article as it passes through said tube.

4. Apparatus as described in claim 2 wherein the angle of inclination and speed of rotation of said tube are balanced with the weight of the disclike article being oriented so that ON<OQ, wherein:
ON is the centrifugal moment of force vector exerted on the disclike article, and
OQ is the gravity moment of force vector of the disclike article as it passes through said tube.

5. Apparatus as described in claim 1 wherein the angle of inclination of said tube is substantially 20° to 30° from the horizontal and the speed of rotation thereof is substantially 50 to 300 r.p.m.

6. Apparatus as specified in claim 5 wherein the weight of each said disclike article is substantially 30 to 40 grams, the angle of inclination and speed of rotation of said tube being balanced with the weight of each said disclike article so that ON<OQ, wherein:
ON is the centrifugal moment of force vector exerted on the disclike article and
OQ is the gravity moment of force vector of the disclike article as it passes through said tube.

7. Apparatus as described in claim 1 wherein the dimension of each said disclike article is substantially:
Do—26 mm.–420 mm.
W — 8 mm.– 80 mm.
and wherein Do>W.

8. Apparatus as described in claim 1 wherein the angle of inclination of said tube is substantially 20° to 30° from the horizontal and the speed of rotation thereof is substantially 50 to 300 r.p.m., the dimension of each said disclike article is substantially:
Do—26 mm.–420 mm.
W — 8 mm.– 80 mm.
and wherein Do>W, the weight of each said disclike article is substantially 30 to 40 grams, and the angle of inclination and speed of rotation of said tube are balanced with the weight of each said disclike article so that ON<OQ, wherein:
ON is the centrifugal moment of force vector exerted on the disclike article and
OQ is the gravity moment of force vector of the disclike article as it passes through said tube.

* * * * *